US012749746B2

(12) United States Patent
Feichtinger et al.

(10) Patent No.: US 12,749,746 B2
(45) Date of Patent: Sep. 29, 2026

(54) HOUSING PART, IN PARTICULAR LOWER HOUSING PART, OF AN ENERGY STORAGE HOUSING, ENERGY STORAGE HOUSING, AND METHOD FOR PRODUCING A HOUSING PART

(71) Applicant: Bayerische Motoren Werke Aktiengesellschaft, Munich (DE)

(72) Inventors: Jens Feichtinger, Holzkirchen (DE); Michael Kaeser, Freising (DE); Andres Perez De Gracia, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 705 days.

(21) Appl. No.: 18/028,260

(22) PCT Filed: Oct. 4, 2021

(86) PCT No.: PCT/EP2021/077220

§ 371 (c)(1),
(2) Date: Mar. 24, 2023

(87) PCT Pub. No.: WO2022/084012

PCT Pub. Date: Apr. 28, 2022

(65) Prior Publication Data

US 2023/0378575 A1 Nov. 23, 2023

(30) Foreign Application Priority Data

Oct. 22, 2020 (DE) ..................... 10 2020 127 794.6

(51) Int. Cl.

*H01M 50/169* (2021.01)
*B60L 50/64* (2019.01)
*H01M 50/249* (2021.01)

(52) U.S. Cl.

CPC ........... *H01M 50/169* (2021.01); *B60L 50/64* (2019.02); *H01M 50/249* (2021.01); *H01M 2220/20* (2013.01)

(58) Field of Classification Search

CPC ............. H01M 50/166; H01M 50/169; H01M 50/20–211; H01M 50/218–224;

(Continued)

(56) References Cited

U.S. PATENT DOCUMENTS

2018/0138565 A1 5/2018 Lee et al.
2019/0100090 A1 * 4/2019 Matecki .............. H01M 50/204

FOREIGN PATENT DOCUMENTS

CN 107530826 A 1/2018
CN 108436274 A 8/2018

(Continued)

OTHER PUBLICATIONS

Machine translation of Leischner, DE 10 2012111393. Originally available May 28, 2014. (Year: 2014).*

(Continued)

*Primary Examiner* — Nicole M. Buie-Hatcher
*Assistant Examiner* — Jacob Buchanan
(74) *Attorney, Agent, or Firm* — Crowell & Moring LLP

(57) ABSTRACT

A housing part, in particular a lower housing part, of an energy storage housing, has two mutually spaced longitudinal elements which run in parallel with one another and extend in a longitudinal direction. The longitudinal elements are connected at end faces via transverse elements. A planar base element is fastened to the longitudinal elements. The longitudinal elements have contact regions which are oriented towards the base element, by which contact regions the base element is fastened to the longitudinal elements. Three weld seams extending in the longitudinal direction are formed in each of the contact regions.

17 Claims, 1 Drawing Sheet

(58) Field of Classification Search
CPC ........... H01M 50/233–236; H01M 50/24–242; H01M 50/247–249; H01M 50/258–262; H01M 50/271–276
See application file for complete search history.

(56) References Cited

FOREIGN PATENT DOCUMENTS

| | | | | | |
|---|---|---|---|---|---|
| CN | 108705199 | A | | 10/2018 | |
| CN | 110587165 | A | | 12/2019 | |
| CN | 111446397 | A | * | 7/2020 | ............ H01M 50/35 |
| DE | 10 2012 209 349 | A1 | | 5/2013 | |
| DE | 102012111393 | A1 | * | 5/2014 | ............. H05K 5/066 |
| DE | 11 2018 005 556 | T5 | | 6/2020 | |
| KR | 20180132338 | A | * | 12/2018 | .......... H01M 2/1077 |

OTHER PUBLICATIONS

Machine translation of Jin, KR 20180132338. Originally available Dec. 12, 2018. (Year: 2018).*

Machine translation of Liang, CN 111446397. Originally available Jul. 24, 2020. (Year: 2020).*

Seffer, O. et al., "Investigations on remote laser beam welding of dissimilar joints of austenitic chromium-nickel steel (X5CrNi18-10) and aluminum alloy (AA6082-T6) for battery housing", Journal of Laser Applications, American Institute of Physics, Jun. 12, 2018, vol. 30, No. 3, XP012229177, 2 Huntington Quadrangle, Melville, NY 11747 (five (5) pages).

International Search Report (PCT/ISA/210) issued in PCT Application No. PCT/EP2021/077220 dated Feb. 1, 2022 with English translation (six (6) pages).

German-language Written Opinion (PCT/ISA/237) issued in PCT Application No. PCT/EP2021/077220 dated Feb. 1, 2022 (seven (7) pages).

German-language Search Report issued in German Application No. 102020127794.6 dated May 3, 2021 with partial English translation (10 pages).

English translation of Chinese-language Office Action issued in Chinese Application No. 202180058765.9 dated Jan. 9, 2026 (9 pages).

* cited by examiner

HOUSING PART, IN PARTICULAR LOWER HOUSING PART, OF AN ENERGY STORAGE HOUSING, ENERGY STORAGE HOUSING, AND METHOD FOR PRODUCING A HOUSING PART

BACKGROUND AND SUMMARY

The present invention relates to a housing part, in particular a lower housing part of an energy storage housing, as well as to an energy storage housing and a method for producing such a housing part.

Energy storage housings of the type under discussion are used in partially and fully electrified motor vehicles. The batteries or battery modules are accommodated in such housings. In order to be able to cover the required ranges, the storage devices or the housings thereof are very large. In passenger motor vehicles they often form a large region of the floor assembly. The provision of sufficient crash safety constitutes a significant challenge in this context. In particular, a side impact represents a critical situation.

It is an object of the present invention to provide a housing part, in particular a lower housing part of an energy storage housing, as well as to provide an energy storage housing and a method for producing such a housing part, wherein the highest requirements for crash safety are intended to be fulfilled, while being inexpensive at the same time.

This object is achieved by a housing part, by an energy storage housing, and by a method, in accordance with the independent claims. Further advantages and features are found in the dependent claims as well as the description and the accompanying figures.

According to the invention, a housing part, in particular a lower housing part of an energy storage housing, comprises two mutually spaced longitudinal elements which run or are oriented in parallel with one another and extend in a longitudinal direction, wherein the longitudinal elements are connected at the end faces indirectly or directly via transverse elements, wherein a plate-shaped base element is fastened to the longitudinal elements, and wherein the longitudinal elements have contact regions which are oriented toward the base element, by means of which contact regions the base element is fastened to the longitudinal elements, and wherein three weld seams extending in the longitudinal direction are formed on each of the contact regions.

The longitudinal elements and the aforementioned transverse elements can be connected to one another indirectly or directly. Expediently, the longitudinal elements and the transverse elements form a frame. Expediently, the base element is arranged or fastened to the frame. According to a preferred embodiment, the housing part is a lower housing part. The base element is thus oriented toward a road plane. Alternatively, the housing part can also be an upper housing part, wherein the base element is then oriented toward a passenger compartment. In any case, the housing part is designed to be connected to a cover or the like which is configured in a congruent manner, so that a closed arrangement space can be formed for arranging, for example, battery modules. Expediently, the contact regions which are oriented in a strip-shaped manner in the longitudinal direction are configured on the longitudinal elements. Expediently, the longitudinal direction corresponds to a direction of travel when the housing part, in particular the lower housing part, is installed in a vehicle such as a passenger motor vehicle. The three weld seams are arranged adjacent to one another and run along the contact region or the contact regions.

According to a preferred embodiment, the housing part under discussion, in particular the lower housing part, has a length of, for example, 1.5 to 3.5 m along the longitudinal axis. A width of the housing part, in particular of the lower housing part, measured along the transverse elements, preferably ranges from 0.8 to 2.2 m according to different embodiments.

Expediently, it can be achieved by means of the contact regions and the three weld seams extending in each case in the longitudinal direction that a sufficiently high crash safety can be obtained with a housing part of such a size, even in the event of a side impact. It has been surprisingly proven that a very high degree of strength and stiffness can be achieved by the parallel arrangement of the three weld seams, in each case in one plane, wherein the plane is predetermined by the respective contact region, without otherwise having to increase the construction effort. In particular, there is no failure of the welded connection(s).

According to a preferred embodiment, the contact region has, or the contact regions have, a width ranging from approximately 15 to 25 mm, measured transversely to the longitudinal direction. In particular, a width ranging from 16 to 20 mm, in particular of 18 mm or approximately 18 mm, has proved expedient.

Preferably, the contact regions are configured to be flat or planar and are located in each case at the same height. Expediently, the contact regions are configured at the bottom on the longitudinal elements, wherein the side of the longitudinal elements which is oriented parallel to a road plane or is directed toward this road plane is denoted by the term "bottom".

According to a preferred embodiment, a weld seam is configured in each case on the edge of the contact region, wherein a third weld seam is arranged centrally. Expediently, there is an inner weld seam, a central weld seam and an outer weld seam, wherein the inner weld seam is oriented toward a vehicle center. The expression "on the edge" is to be understood to mean here that the outer or inner weld seam is not configured in the surface of the contact region, as is the central weld seam, but on the sides or edges of the contact region.

Expediently, a different welding method is used for the central weld seam than for the weld seams on the edge. It has been shown that it is particularly advantageous to design the weld seams differently depending on the position, wherein in particular a different welding method is used for the central weld seam than for the outer weld seam or the inner weld seam. According to one embodiment, the inner weld seam and the outer weld seam can also be generated by different methods.

According to a preferred embodiment, a pressure welding method, preferably in particular friction stir welding, is used for the central weld seam and a fusion welding method, such as in particular MIG welding (MIG, metal inert gas welding), is used for the weld seams on the edge. The preferred welding methods are not limited to the aforementioned examples. It has been proven, however, that in order to ensure the high degree of side impact protection required here, it is particularly expedient to use an inert gas welding method for the inner weld seam or the outer weld seam, and a pressure welding method, such as in particular friction stir welding, for the central seam.

Expediently, the weld seams are configured to be continuous. Thus according to a preferred embodiment, the weld seams extend along the contact region or along the longitudinal element from one transverse element to the next.

According to an alternative embodiment, the central weld seam is configured to be continuous, wherein at least the inner weld seam or the outer weld seam is configured to be stepped. This can be advantageous since, for example, distortion during welding can be minimized thereby.

According to a preferred embodiment, a wall thickness of the base element can range from approximately 5 to 6 mm. A preferred material for the base element is aluminum or an aluminum alloy.

According to a preferred embodiment, the longitudinal elements are extruded profiles. Preferred materials here are also aluminum materials or aluminum alloys. According to one embodiment, the longitudinal element can be configured as a longitudinal member. For example, a sill element is arranged in each case on the outside of such a longitudinal member. Alternatively, the longitudinal element can also be configured directly as a sill element. The longitudinal member and the sill element can be configured integrally in one component. The actual design is dependent on the integration of the housing part in the entire vehicle.

The invention relates to an energy storage housing, in particular a high voltage storage housing, comprising a housing part according to the invention, in particular a lower housing part. Such an energy storage housing expediently comprises a plurality of battery cells or battery modules. Such a high voltage storage housing serves, in particular, for accommodating a traction battery, for a partially or fully electrically operated or operatable (motor) vehicle. Preferred vehicles are, in particular, motorcycles, utility vehicles and, in particular, passenger motor vehicles.

The invention further relates to a method for producing a housing part, wherein the method comprises the steps:

- providing a base element and two longitudinal elements which extend in a longitudinal direction;
- fastening the longitudinal elements to the base element in each case via three weld seams which extend in the longitudinal direction.

The advantages and features mentioned in the context of the housing part or the energy storage housing apply similarly and accordingly to the method and vice versa and relative to one another. In the present case, it has been surprisingly shown that the highest demands for crash safety can be achieved by a targeted design of the contact regions between the base element and the longitudinal elements, via an adapted welded structure, without having to change the housing structure as such. The three weld seams, which in each case run or are oriented parallel to one another along the contact regions, are crucial here, wherein the different procedures during the production of the welded connections is also particularly advantageous, in particular, in this context. Thus, in particular, a pressure welding method, such as friction stir welding, has proved particularly advantageous in the central region of the contact region, while conventional welding methods, such as MIG welding, are expedient for the edge regions or side regions of the contact region.

Further advantages and features are found in the following embodiment of a detail of a housing part with reference to the accompanying figures.

DETAILED DESCRIPTION OF THE DRAWINGS

Figure 1:
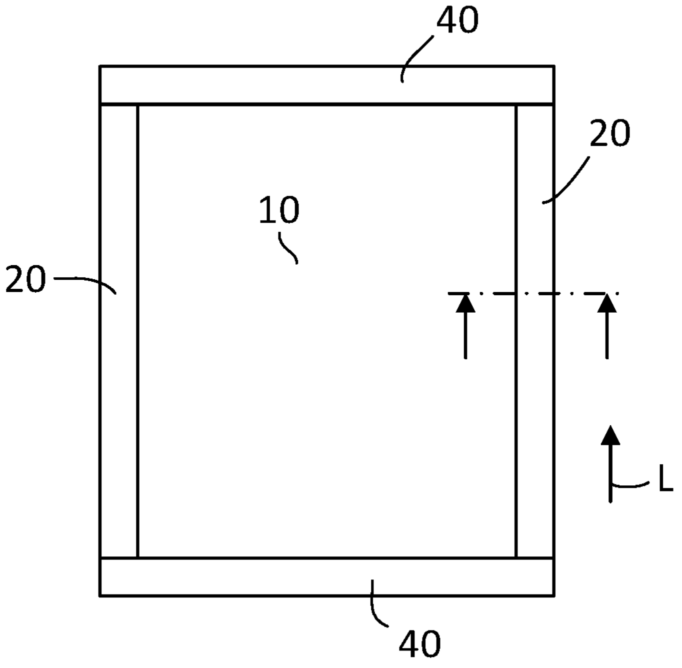
FIG. 1 is a basic sketch of a lower housing part in a view from above.

FIG. 1 shows, in a schematic view, a housing part, in particular a lower housing part, in a view from above. A base element 10 is arranged parallel to a drawing plane. This base element 10 is arranged or fastened from below on a frame, which is formed by two longitudinal elements 20 and in each case transverse elements 40 arranged at the end faces. The longitudinal elements 20 extend in a longitudinal direction L, wherein in the installed state of the lower housing part this longitudinal direction corresponds to a direction of travel of the respective vehicle. A section, which is shown in FIG. 2, is sketched by the dashed-dotted line.

Figure 2:
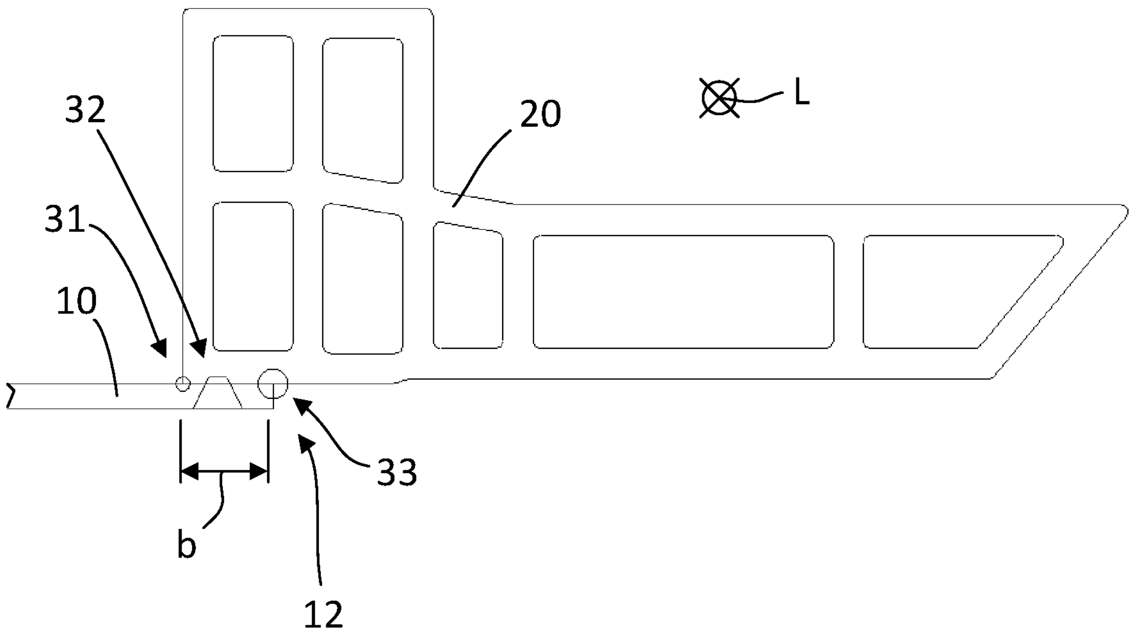
FIG. 2 is a schematic detailed view of a lower housing part as sketched in FIG. 1.

FIG. 2 shows the section as illustrated in FIG. 1. The longitudinal element 20, which is configured in the present case as an extruded profile, can be identified. The reference sign 12 denotes a contact region which is configured on the longitudinal element 20 or on the base element 10 and via which the two parts are arranged adjacent to one another. The contact region 12 can also be denoted as the overlapping region since the two parts overlap there. The contact region 12 extends, in the same manner as the longitudinal element 20 or the longitudinal elements 20, in each case in the longitudinal direction L. It is schematically shown that three weld seams are provided in the contact region 12, namely an inner weld seam 31, a central weld seam 32 and an outer weld seam 33. Preferably, the central weld seam 32 is a friction stir weld seam. Further preferably, the outer weld seams 31, 33 are MIG weld seams. The MIG weld seams 31 and 33, which are configured for example as fillet welds, are arranged on the edge of the contact region 12, while the friction stir weld seam 32 is arranged approximately or substantially centrally in the contact region 12. A width b of the contact region is, for example, between 16 and 20 mm.

LIST OF REFERENCE SIGNS

10 Base element
12 Contact region, overlapping region
20 Longitudinal element
31 Inner weld seam
32 Central weld seam
33 Outer weld seam
40 Transverse element
b Width of overlapping region
L Longitudinal direction

The invention claimed is:

1. A housing part of an energy storage housing, comprising:

two mutually spaced longitudinal elements which run in parallel with one another and extend in a longitudinal direction,
 wherein the longitudinal elements are connected at end faces via transverse elements;
a plate-shaped base element fastened to the longitudinal elements,
 wherein each of the two longitudinal elements has a contact region at a bottom thereof oriented toward the plate-shaped base element; and
three weld seams extending in the longitudinal direction on the contact region of each longitudinal element by which each longitudinal element is connected to the plate-shaped base element, wherein a first of the three weld seams is configured on an inner edge of the contact region, a second of the three weld seams is configured on an outer edge of the contact region, and a third of the three weld seams is arranged centrally in a surface of the contact region.

2. The housing part according to claim 1, wherein the contact region on each longitudinal element has a width ranging from 15 to 25 mm, measured transversely to the longitudinal direction.

3. The housing part according to claim 1, wherein a different welding method is used for the third weld seam that is arranged centrally than for the first and second weld seams on the inner and outer edges, respectively.

4. The housing part according to claim 3, wherein a pressure welding method is used for the third weld seam, and a fusion welding method is used for the first and second weld seams.

5. The housing part according to claim 1, wherein the first and second weld seams are MIG weld seams, and the third weld seam is a friction stir weld seam.

6. The housing part according to claim 1, wherein the three weld seams are configured to be continuous.

7. The housing part according to claim 1, wherein the third weld seam is configured to be continuous, and at least the first weld seam or the second weld seam is configured to be discontinuous.

8. The housing part according to claim 1, wherein a thickness of the plate-shaped base element ranges from 5 to 6 mm.

9. The housing part according to claim 1, wherein the longitudinal elements are extruded profiles.

10. The housing part according to claim 1, wherein the housing part is a lower housing part of the energy storage housing.

11. A high voltage energy storage housing comprising a housing part according to claim 1.

12. A method for producing a housing part, comprising:

providing a base element, and two longitudinal elements which extend in a longitudinal direction, wherein each of the two longitudinal elements has a contact region at a bottom thereof oriented toward the base element; and welding each of the two longitudinal elements to the base element via three weld seams in the contact region of each of the two longitudinal elements, the three weld seams extending in the longitudinal direction, wherein a first of the three weld seams is configured on an inner edge of the contact region, a second of the three weld seams is configured on an outer edge of the contact region, and a third of the three weld seams is arranged centrally in a surface of the contact region.

13. The method according to claim 12, wherein a different welding method is used for the third weld seam that is arranged centrally than for the first and second weld seams on the inner and outer edges, respectively.

14. The method according to claim 13, wherein a pressure welding method is used for the third weld seam, and a fusion welding method is used for the first and second weld seams.

15. The method according to claim 13, wherein the first and second weld seams are MIG weld seams, and the third weld seam is a friction stir weld seam.

16. The method according to claim 12, wherein the three weld seams are configured to be continuous.

17. The method according to claim 12, wherein the third weld seam is configured to be continuous, and at least the first weld seam or the second weld seam is configured to be discontinuous.

* * * * *